United States Patent [19]
Large

[11] Patent Number: 5,161,757
[45] Date of Patent: Nov. 10, 1992

[54] EXTENDING BENT SHAFT FLAP DRIVE

[75] Inventor: David T. Large, Everett, Wash.

[73] Assignee: The Boeing Company, Seattle, Wash.

[21] Appl. No.: 387,031

[22] Filed: Jul. 31, 1989

[51] Int. Cl.$^5$ ................................ B64C 9/16
[52] U.S. Cl. ..................... 244/216; 244/213
[58] Field of Search ............... 244/213, 214, 216, 217

[56] References Cited

U.S. PATENT DOCUMENTS

| | | | |
|---|---|---|---|
| 2,670,909 | 3/1954 | Replogle | 244/213 X |
| 3,126,173 | 3/1964 | Alvarez-Calderon | 244/213 X |
| 3,721,406 | 3/1973 | Hurbert | 244/213 X |

Primary Examiner—Brian S. Steinberger
Attorney, Agent, or Firm—Elizabeth F. Harasek; B. A. Donahue

[57] ABSTRACT

Novel means for deploying airplane wing flaps feature a bent shaft which is translatable fore and aft in the fairing cavity. The shaft has an adjacent follower member which travels in a concentric curved flap track to rotate shaft as it extends. The bent shaft has a support ball fitting and end roller which provide flap deflection with respect to the fixed wing as the shaft is extended aft and rotated. The subject flap deployment means are mechanically elegant resulting in lower manufacturing and installation cost and high reliability.

12 Claims, 3 Drawing Sheets

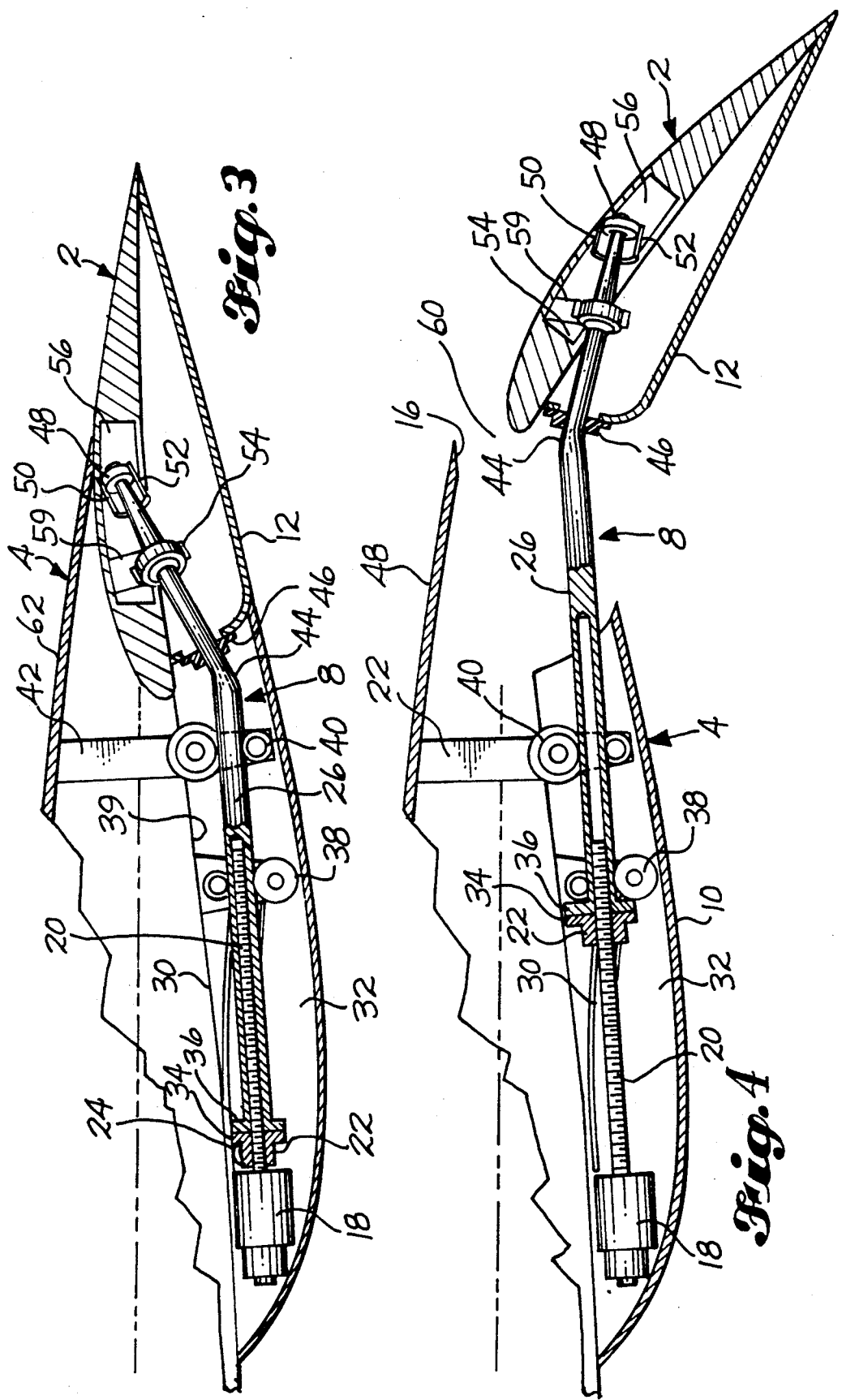

EXTENDING BENT SHAFT FLAP DRIVE

BACKGROUND

This invention relates to novel means for deploying trailing edge wing flaps. More particularly, this invention relates to means for extending and deflecting wing flaps embodying an extensible, rotatable elbowed shaft.

The trailing edge flap system for commercial aircraft such as the Boeing 727, 737, 747, 757 and 767 airplane families, provides additional lift when it is needed. Flap extension and deflection increase the camber of a wing. During periods of high lift need, such as takeoff and landing, wing flaps are extended aft which opens up a slot between the trailing edge of the fixed wing and the leading edge of the extended flap. This allows air to circulate from the lower wing surface up and over the flap which increases lift by reducing the stagnation of airflow above the flap surface.

Many different mechanisms have been developed to deploy wing trailing edge flaps. Most of these incorporate a number of complex mechanical linkages to provide aftwise flap extension simultaneous with flap deflection at a desired angle with respect to the fixed wing.

The subject invention provides a novel, simplified flap drive which minimizes the number of linkages and mechanical parts. Accordingly, it is reliable but less costly to manufacture, install and maintain.

BRIEF SUMMARY

In a preferred embodiment of the subject invention, two similar and co-acting flap drive mechanisms are located between the inboard and outboard sides of each trailing edge wing flap. Each drive mechanism features a bent shaft that extends from the fairing cavity in the fixed wing into the flap. The shaft has a doglegged bend in front of the point where it is journaled in the flap. As the shaft is extended aft, it is caused to rotate by travel of an attached cam follower in a surrounding helical flap track. Rotation of the shaft causes the doglegged end to deflect the flap at a predetermined angle. Extension of the shaft moves the flap aft.

FIGURES

FIG. 3 shows a side sectional view of a flap drive with the flap in the retracted position. FIG. 4 shows a like view with the flap in a deployed position.

DETAILED DESCRIPTION

My invention will be better understood in view of the detailed description of a preferred embodiment which follows.

Figure 1:
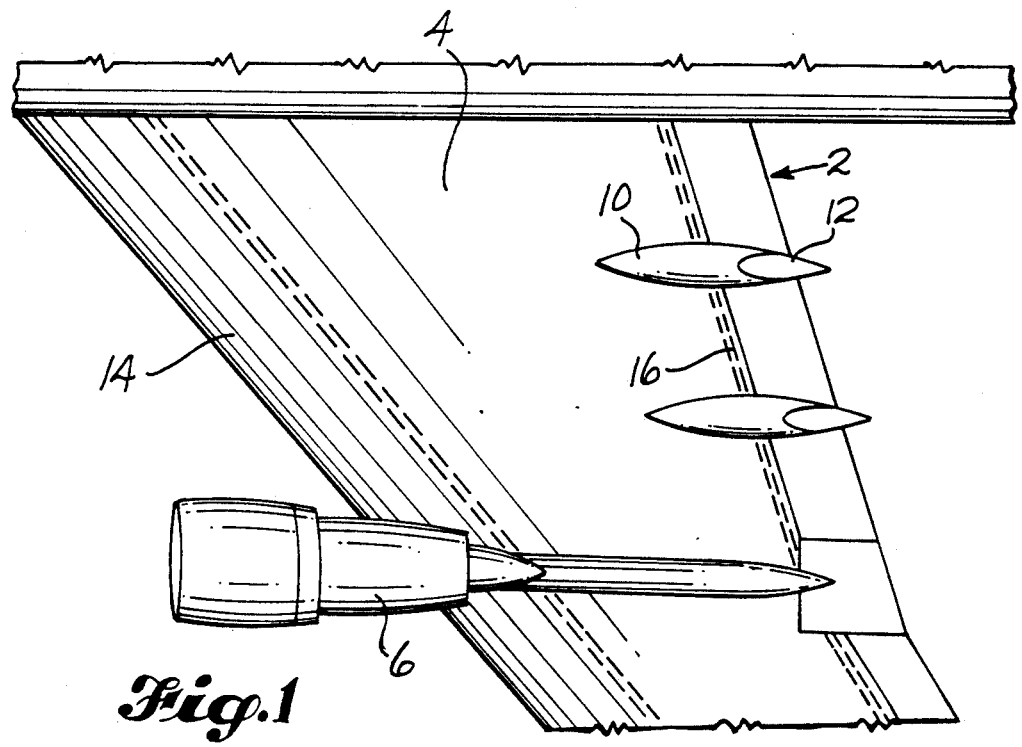
FIG. 1 is a plan view of the underside of the right wing of an aircraft showing an engine and two nested inboard flap fairings.

Referring to FIG. 1 inboard flap 2 is shown for the right fixed wing 4 of a swept wing airplane having a wing mounted engine 6. In the several figures, the like details of the two co-acting flap deployment assemblies 8 and 8' will be identified by a single detail number.

Figure 2:
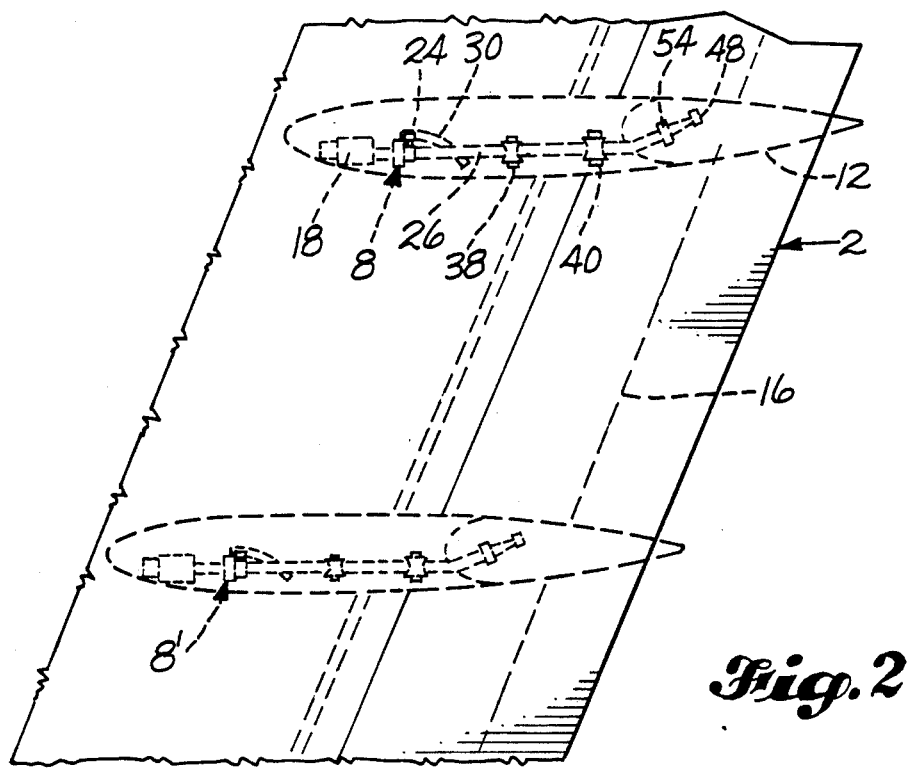
FIG. 2 shows a plan view of a section of the underside of a right wing showing portions of the flap drives in phantom lines with the flap in a partially extended position.

FIG. 2 shows a plan section of a portion of wing 4 and trailing edge flap 2 with elements of two subject flap drives 8 and 8' shown in phantom lines. Flap actuating assemblies 8 and 8' are each concealed by a stationary aerodynamic fairing 10 on fixed wing 4 and a nesting fairing 12 on flap 2. Fairings 12 move with flap 2 when it is deployed. The mechanism for deploying leading edge flap 14 is not shown.

Assemblies 8 and 8' are identical to provide parallel deployment of flap 2 from the trailing edge 16 of fixed wing 4.

Figure 6:
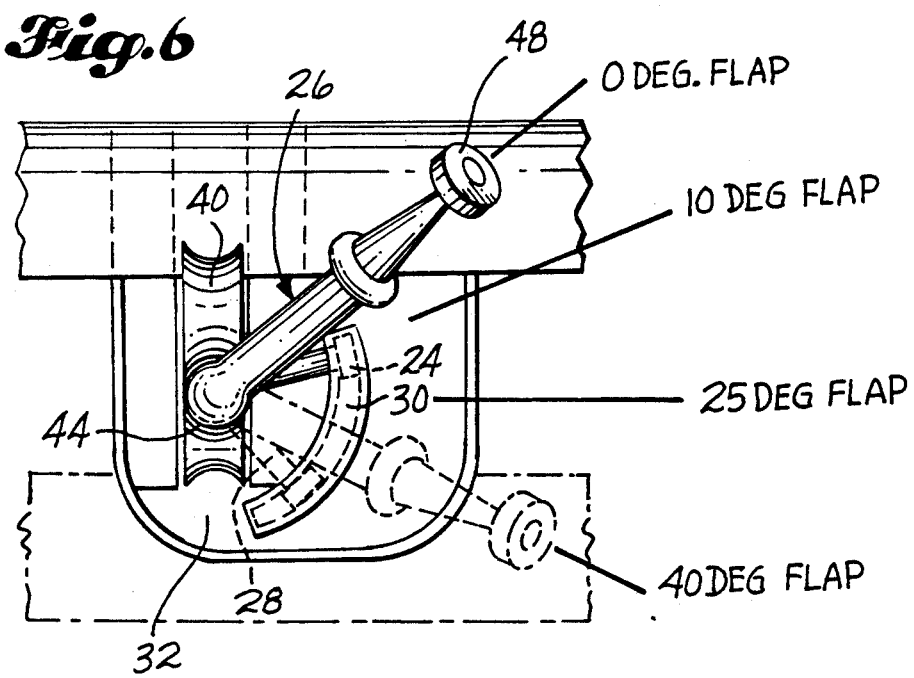
FIG. 6 is an end view of the flap drive of FIGS. 3 and 4 showing the relative positions of the follower in helical flap track, the doglegged end of the shaft, the ball joint flap support and the end swipe roller.

FIGS. 3 and 4 are detailed sections of a flap drive 8 or 8' showing a drive motor 18, jackscrew 20, and threaded 22 collar with attached follower 24 for extending and rotating the bent deployment shaft 26. Collar 22 is threaded on its inside diameter to travel for and aft as jackscrew 20 is rotated. Follower 24 is attached to collar 22 by arm 28, best seen at FIG. 6. Follower 24 travels in and its motion is guided by flap track 30. Flap track 30 is helically shaped and concentric to a portion of shaft 26 inside fairing cavity 32. Flap track 30 sized and shaped to rotate through the desired angle of deflection with respect to aftwise travel for extension of flap 2. Flange 34 of collar 22 may be attached to flange 36 of shaft 26 by bolts (not shown).

Shaft 26 is rigidly cantilevered to extend aft between for and aft sets of guide rollers numbered 38 and 40, respectively. Front rollers 38 are secured to a wing inner rib at lower wing surface 39. Rollers 40 are secured to rear spar 42.

Shaft 26 has a doglegged bend on elbow 44 behind aft rollers 40 forward of swipe seal 46 in fairing 12 of flap 2. Shaft 26 is shown as a single piece but a plurality of shaft segments could be rigidly joined together instead as would be apparent to one skilled in the art. The angle of bend 44 in shaft 26 is determined by the amount of deflection desire cooperative with controlled rotation of the shaft by the travel of follower 24 in track 30.

A deflection roller or final 48, is located at the end of shaft 26. It is biased between upper deflection plate 50 and lower deflection plate 52 as the end of shaft 26 swipes due to shaft rotation. Ball fitting pivotable support 59 is located aft of the dogleg bend on shaft 26 in front of end roller 48 and it mounts in flap 2 within cavity 56 to support flap 2 and facilitate flap deployment through the pivoting of shaft 26 at ball fitting 59. In the embodiment shown, deflection plates 50 and 52 are located in cavity 56 in the upper portion 58 of flap 2.

To extend flap 2 from a stowed position, as shown in FIG. 3, to an extended position, as shown in FIG. 4, motor 18 rotates jackscrew 20. As jackscrew 20 turns, collar 22 travels aftwards and follower 24 moves in flap track 30. Collar 22 pushes shaft 26 aft and movement of follower 24 causes shaft 26 to rotate at an angle commensurate with the desired flap deflection. End roller 48 swipes between deflection plates 50 and 62. At full flap extension, further travel of shaft is prohibited by the curved portion of flange 36 meeting guide rollers 38.

Figure 5:
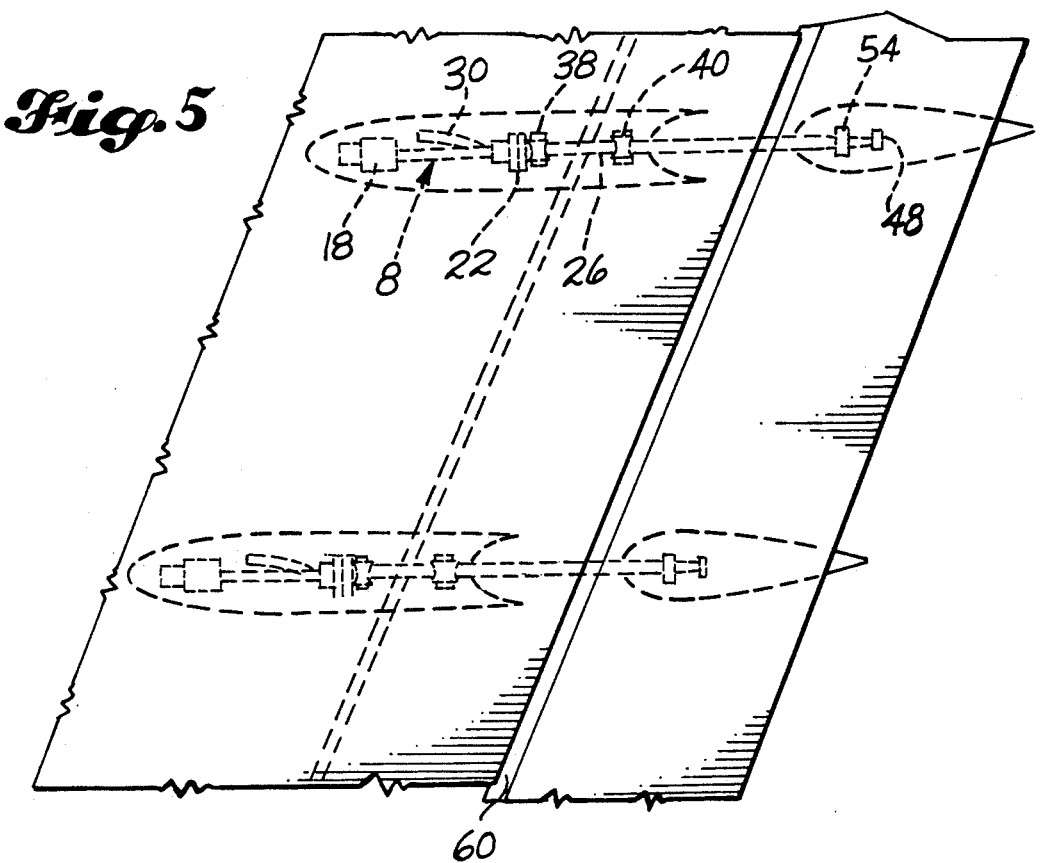
FIG. 5 shows a view similar to FIG. 2 with the flap in the fully extended position and a slot between the wing and flap.

Stops, limit switches or other known means may be used to indicate and/or arrest flap deployment at desired angles such as 10, 15, 25 or 40 degrees of deflection. Generally, lower flap angles such as 10° or 20° are used to provide high wing lift during takeoff while greater flap settings of 25° to 40° are used on landing. FIG. 3 shows flap 2 in the retracted position. FIG. 2 shows the flap extended to about 10°. FIGS. 4 and 5 show the flap extended to about 40°. Such flap extensions create a high lift slot 60 between top 62 of wing 4 and flap 2.

While my invention has been described in terms of specific embodiments thereof, other forms may be readily adapted by one skilled in the art. For example, a like mechanism could be used to deploy mid and aft sections of multisegmented flaps. Accordingly, the scope of the invention is to be limited only in accordance with the following claims.

I claim:

1. Means for deploying airplane wing flaps said means comprising a bent shaft which is translatable in a generally fore and aft direction, a flap track concentric with said shaft, a follower which travels in said flap track to rotate said shaft, means for translating said shaft fore and aft, and a final on said shaft which travels between flap plates to provide flap deflection relative to the wing as said shaft translates fore and aft and is rotated by follower travel in said flap track.

2. Means for deploying airplane trailing edge fixed wing flaps, said means comprising a support shaft which is rotatable and translatable in a generally fore and aft direction between at least two sets of support rollers, said shaft having a doglegged bend; a helical flap track concentric with at least a portion of said support shaft; a follower attached to said support shaft which travels in said flap track; a jackscrew which rotates in a threaded collar fixed to said, support shaft to translate said shaft fore and aft; and a roller which swipes between parallel plates as said shaft translates fore and aft and is rotated by the travel of the follower in the flap track.

3. Means for deploying airplane wing flaps said means comprising a shaft having a doglegged bend therein which shaft is translatable in a generally fore and aft direction, a curved flap track adjacent said shaft, a follower cooperative with said shaft which travels in said flap track, means for translating said shaft fore and aft, and roller means which operate cooperatively with said follower and translating means to provide deflection of the flap with respect to the wing as said shaft translates fore and aft.

4. Means for deploying airplane trailing edge wing flaps, said means comprising a bent support shaft which is rotatable and translatable in a generally fore and aft direction between at least one set of support rollers mounted to the wing structure, a curved flap track adjacent said support shaft, a follower member adjacent said support shaft which travels in said flap track, jackscrew means rotatable in a threaded collar for translating said support shaft fore and aft, an intermediate spherical bearing attachment and a final roller aft of the bend in said shaft which operate cooperatively to provide deflection of the flap with respect to the wing as said support shaft rotates and moves fore and aft between said support rollers and said follower member travels in said curved flaps track.

5. The means of claim 1 additionally comprising a second plate parallel to said plate, said final traveling therebetween.

6. The means of claim 1 additionally comprising a supporting ball joint between said final and the bend in said shaft.

7. The means for deploying airplane wing flaps of claim 3 where the means for translating the bent shaft is a jackscrew rotatable in a threaded collar attached to said shaft.

8. The means for deploying airplane wing flaps of claim 3 wherein the doglegged shaft is journaled in the lower flap fairing and the roller means are located between the upper and lower movable flap fairings.

9. The means for deploying airplane wing flaps of claim 3 wherein a slot is formed between the trailing edge of the top surface of the wing and the flap in an extended position.

10. The means for deploying airplane wing flaps of claim 4 wherein a slot is formed between the trailing edge of the top surface of the wind and the flap in a flap extended aft position.

11. The means for deploying airplane wing flaps comprising at least two assemblies which are mechanically linked to operate cooperatively, each said assembly comprising a bent shaft which is translatable in a generally fore and aft direction, a curved flap track adjacent said shaft, a follower cooperative with said shaft which travels in said flap track to rotate shaft as it extends, means for translating said shaft fore and aft, and roller means aft of the bend in said shaft which operates cooperatively to provide deflection of the flap with respect to the wing as said shaft translates fore and aft and revolves.

12. The means for deploying wing flaps of claim 1, 2, 3, 4 or 10 where the shaft comprises a plurality of rigidly joined sections.

* * * * *